Nov. 29, 1938.　　　　　E. DAVIS　　　　　2,138,372
CHECKING MECHANISM
Filed June 12, 1937　　　3 Sheets-Sheet 1
FIG. I
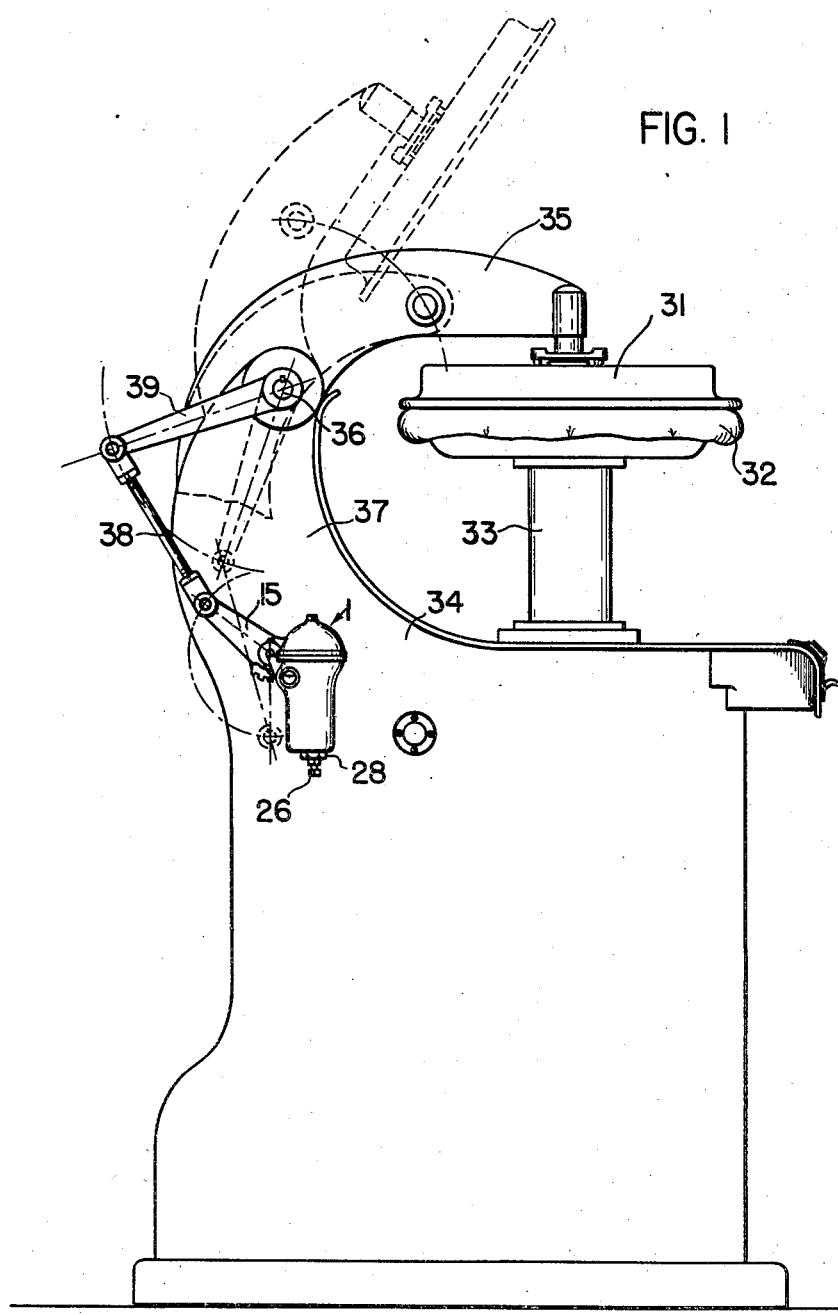
INVENTOR.
ERNEST DAVIS
BY *Bodell & Thompson*
ATTORNEYS.

Nov. 29, 1938.  E. DAVIS  2,138,372
CHECKING MECHANISM
Filed June 12, 1937  3 Sheets-Sheet 2
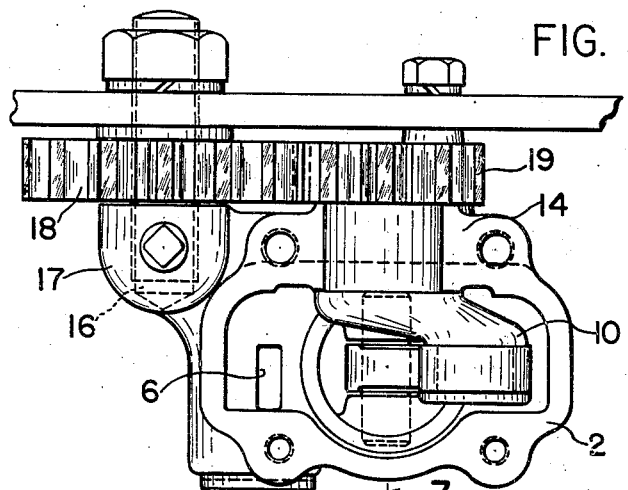
FIG. 4
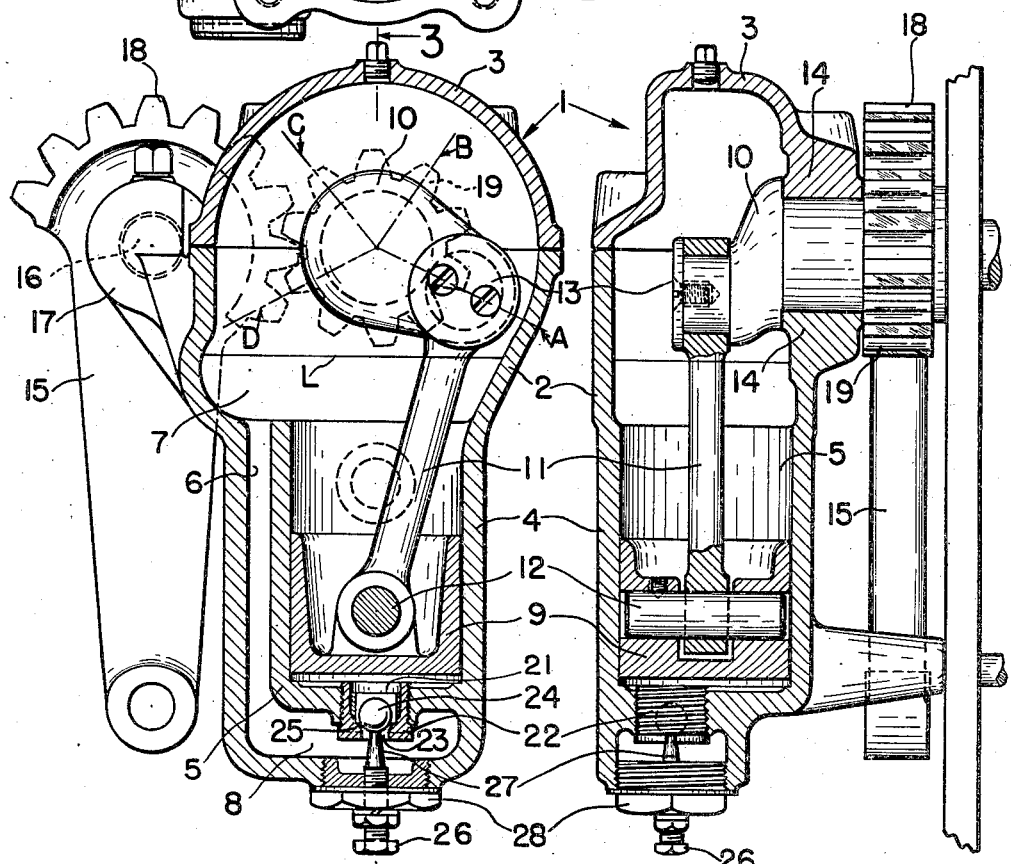
FIG. 3
FIG. 2
INVENTOR.
ERNEST DAVIS
BY *Bodell & Thompson*
ATTORNEYS.

Nov. 29, 1938.  E. DAVIS  2,138,372
CHECKING MECHANISM
Filed June 12, 1937  3 Sheets-Sheet 3

INVENTOR.
ERNEST DAVIS
ATTORNEYS.

Patented Nov. 29, 1938

2,138,372

UNITED STATES PATENT OFFICE 2,138,372

CHECKING MECHANISM

Ernest Davis, Syracuse, N. Y., assignor to The Prosperity Company, Inc., Syracuse, N. Y., a corporation of New York Application June 12, 1937, Serial No. 147,993

6 Claims. (Cl. 188—94)

This invention relates to checks or check mechanisms, particularly a check for machines having an opening and a closing movement for checking or absorbing the shocks as the machine approaches the end of the closing movement and as it approaches the end of the opening movement, and has for its object a check mechanism using a hydraulic liquid, and so constructed that the liquid is retained in a reservoir without liability of leaking or working out, and without stuffing boxes.

It further has for its object a construction in which the checking mechanism or the check valve is readily accessible and also easily adjustable to obtain different checking effects.

It further has for its object a check mechanism embodying a piston chamber and a piston reversely movable therein and having a complete back and forth movement during each operation, that is, during each opening movement of the machine and each closing movement of the machine, with maximum checking effect at the end of each back and forth movement or reciprocation, when the machine approaches wide open or completely closed position.

It further has for its object a check mechanism embodying a piston chamber and a reversely movable piston member therein, in which the chamber and piston are immersed in the hydraulic liquid, together with motion transmitting means, the bearings of which are located outside of the liquid and outside the pressure area, so that the hydraulic liquid can not work out through bearings for movable parts.

It further has for its object the relative arrangement of the piston chamber and piston member therein immersed in the hydraulic liquid, with a check valve port arranged in such a manner that there is a free flowing of the liquid during the non-checking periods in the movement of the piston and a readily controllable or adjustable checking effect during the checking period.

The invention consists in the novel features and in the combinations and constructions hereinafter set forth and claimed.

In describing this invention, reference is had to the accompanying drawings in which like characters designate corresponding parts in all the views.

Figure 1 is an elevation of one type of machine having an opening and a closing movement to which this check is applied.

Figure 2 is a vertical sectional view through the check mechanism.

Figure 3 is a sectional view on line 3—3, Figure 2.

Figure 4 is a plan view of parts seen in Figure 2 with the top portion of the casing removed.

Figure 5:
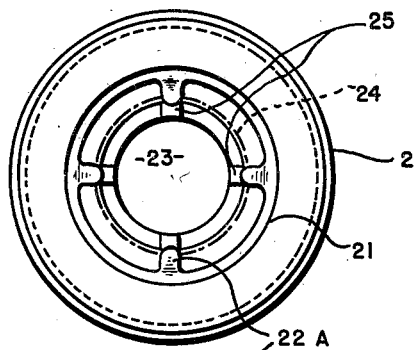
Figure 5 is an enlarged plan view of the cage for the check valve shown in Figure 2.

This check mechanism comprises, generally, a suitable casing having a reservoir for receiving a checking liquid, a piston chamber arranged in the reservoir, in order to be immersed in the liquid therein, a piston member working in the chamber and having a back and forth movement, a crank shaft journalled in the casing outside the reservoir, and motion transmitting means between the piston member and the crank shaft including an element extending outside of the reservoir above the level of the liquid therein, a reversely movable actuating member for connection to a moving part of the machine having the opening and closing movement, and a reduction leverage mechanism between the actuating member and the shaft to cause the piston member to make a complete back and forth movement during the movement of the actuating member in one direction and a complete back and forth movement during the movement of said actuating member in the opposite direction, the chamber having a port opening into the reservoir, the radial angle of the crank to the piston being such that there is a maximum checking effect during the end only of the reciprocation of the piston and very little during the starting of the piston, and practically none during the intermediate part of each reciprocation, while the machine or the movable element thereof is between wide open and closed positions. The check mechanism further includes a valve in the port, and means for normally adjusting and holding the valve a predetermined distance off its seat in the port, so that the port is never entirely closed. Owing to the fact that all bearings for the motion transmitting mechanism are located outside the reservoir and outside of the oil or liquid pressure chamber, it is impossible for the liquid or oil to leak or work outside of the casing.

In the illustrated embodiment of the invention, the piston chamber is a cylinder and the piston reciprocates in the cylinder.

1 designates the casing which includes a lower section 2 and a removable upper section or cap 3.

The lower section 2 is provided with an oil reservoir 4 in the lower portion thereof and also in this reservoir is located or formed a piston chamber or cylinder 5 with the passage or by-pass 6 connecting the upper portion 7 of the reservoir and the lower portion 8 around one side of the cylinder 5. The casing has a gage or sight glass for checking the oil level.

9 designates a reciprocating pump piston or plunger in the cylinder 5. 10 designates a crank shaft journalled in the casing outside the reservoir 4 and here shown as above the same, as above the level L of the oil therein.

The motion transmitting means between the piston 9 and the crank of the crank shaft is here illustrated as a connecting rod 11 pivoted at 12 to the piston and mounted at 13 on the crank, the connecting rod extending out to the reservoir 4 above the liquid therein. The crank shaft 10 is mounted in bearings 14 located between the sections 2 and 3 of the casing and entirely out of or above the oil in the reservoir.

15 designates a reversely movable actuator, as a lever arm, having a back and forth movement, as an oscillating movement, the lever 15 being shown as mounted on a shaft 16 journalled in bearings provided on a suitable bracket 17 on the outside of the casing. The reduction leverage mechanism between the arm 15 and the crank shaft 10 preferably consists of gears 18 and 19 keyed respectively on the shaft 16 and the shaft 10 outside of the casing 1. The gear 18 is of larger diameter than the gear 19 and the gear reduction is such or the gears are of such sizes as to provide a leverage ratio of slightly greater than two to one. The ratio is such that the piston makes a complete reciprocation or two strokes, upon movement of the arm 15 in one direction from starting position and one reciprocation or two strokes upon each movement of the actuating arm 15 from its shifted position back to starting position. When the piston is at the end of its "in" stroke or at the lower end of the cylinder 5, in the position shown in Figure 2, the crank is at a radial angle, illustrated by the line A, and is hence at one side of the dead center line, intersecting the axis of the crank shaft 10 and the axis of the pivot connecting the rod 11 to the piston. As the arm moves outwardly from its starting position, the piston moves on its "out" stroke, and when it reaches the end of its "out" or "up" stroke is in the radial position illustrated by the line B, and during continued movement of the arm 15 in the same direction, the piston remains substantially practically stationary while moving from the radius B to radius C, and then during continued movement of the arm 15 in the same direction, the piston moves on its "in" stroke to the lower end of the cylinder 9 and the crank moves into an angular position, illustrated by the radius D. During this movement, the arm 15 has moved through an angle of approximately 130°, and the crank of the shaft is moved through an angle of approximately 232°. During the return movement of the arm 15 to starting position, the shaft 10 is shifted reversely in the same manner, and the piston 9 likewise makes a complete reciprocation, or an "out" or "up" stroke and an "in" or "down" stroke.

Figure 6:
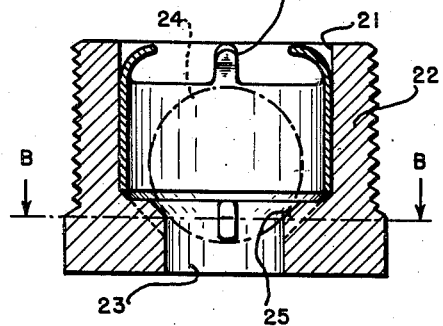
Figure 6 is a sectional view taken diametrically of Figure 5.
Figure 7:
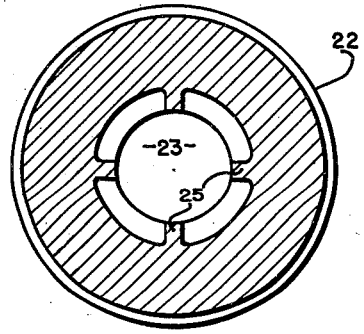
Figure 7 is a sectional view taken on line B—B, Figure 6.

The cylinder 5 is formed with a port in the outer end portion thereof and preferably in the head thereof, which head is spaced apart from the bottom of the reservoir 4. 21 designates the port which is formed in a removable bushing or cage 22 detachably mounted in the wall or head of the cylinder 5, the port being formed with a contracted inlet and outlet passage 23 which is formed with a seat for a valve, as a ball 24. The seat is preferably provided with spaced apart raised spaced projections 25 on the valve seat to prevent the valve from entirely closing the passage 23. The valve or ball 24 is held from displacement out of the cage in any suitable manner, as by an inner cage (Figures 5 and 6) having inwardly extending fingers 22ª overhanging the ball. Also means is provided for adjusting the ball, so that it is normally held a predetermined distance off the seat or projections, in order to vary the passage for the liquid out of the cylinder 5. The means, as here shown, consists of a set screw 26 having a pointed end 27 extending into the passage 23 and thrusting against the ball 24. This adjusting screw, as here shown, threads through a plug or closure 28, which in turn threads in an opening in the bottom of the casing 20 or the reservoir 4, the opening in which the plug threads being of greater diameter than the opening in which the cage 22 threads, so that the cage is removable through the bottom of the casing, when the plug 28 is removed. Hence, the valve 24 and its cage 22 are readily accessible.

In operation, during each "out" or "up" stroke of the piston 9, the oil in the reservoir readily transfers through the by-pass 6 into the cylinder below the piston and flows with a minimum restriction. During the "in" or "down" stroke of the piston 9, the valve or ball is held off the seat by the pin 27 and the oil flows out through the restricted passage between the ball and the wall of the cage, producing a checking effect, which checking effect may be varied by adjusting the screw 26. During the period that the piston is reversing itself and the end of the "out" stroke and beginning of the "in" stroke, there is practically no checking effect.

In Figure 1 is shown a garment or laundry press, which has a uniform opening and closing movement and includes a head or platen 31 which co-operates with a stationary buck or platen 32 mounted on a bolster or goose neck 33, which in turn is mounted on the frame 34 of the machine. The head 31, which has the opening and closing movement, is carried by a lever 35 pivoted at 36 to a standard 37 rising from the frame 34. The actuating arm 15 is connected to the lever 35 through the yoke pin or shaft 36, which is mounted to have a rocking movement with the lever 35. As here shown, the actuating arm 15 is connected by a link 38 to a rock arm 39 keyed on the yoke pin 36. During the closing of the press from open position, indicated by dotted lines (Figure 1), the actuating arm moves from the position shown in Figure 2 to that shown in Figure 1 (solid lines), and the piston 9 first moves upward on its "out" or "up" stroke from the position shown in Figure 2, and during this movement, the oil flows freely from the reservoir, in which the cylinder and piston are immersed, through the port 23 and into the cylinder and follows up the piston without undue resistance. During this movement, the head 31 approaches the buck 32. During the continued movement of the arm away from the position shown in Figure 2, the piston 9 moves on its "down" stroke, after being practically at a standstill, while the crank of the shaft 10 is moving from the radius B to radius C, and then the piston 9 moves on its "down" stroke while the crank is moving from radius C to radius D. During this movement of the piston, the flow of oil out of the cylinder, past the ball valve 24 is restricted in accordance with the adjustment of the valve by the set screw 26. This action causes the checking of the press toward closed position. During the opening of the press, the arm moves from the position shown in Figure 1 to that shown in Figure 2, and the piston 9 moves through the same movement, while the crank is moving from radius D to radius A.

The checking action takes place as the head approaches its wide open position, and the crank passing from radius C to radius D.

It will be understood that in machines of this type a quick closing is desired without slamming of the head 31 down on the buck 32 and that in starting, it is necessary to overcome the static inertia of the head, and in order to prevent slamming, it is necessary to check the momentum of the head, as it approaches closed position, and that in opening the press, a quick opening movement is desired, and in order to obtain a smooth quick opening without violent shock, the head 31 moves upwardly without a material checking effect, until it approaches wide open position, when the opening movement is gradually checked.

What I claim is:—

1. In a check for machines having an opening and a closing movement, a casing formed with a reservoir for a checking liquid and with a cylinder in the reservoir arranged to be immersed in the liquid, the cylinder having a port in its outer end portion opening into the lower portion of the reservoir, a piston working in the cylinder, a crank shaft journalled in the casing outside of the reservoir, a connecting rod between the piston and the crank shaft and extending out of the reservoir, an actuating member having a back and forth movement for connection to a moving part of the machine, and a reduction leverage mechanism between the actuating member and the crank shaft to cause the piston to make a complete reciprocation during the movement of the actuating member in one direction, and a complete reciprocation during the actuation of said member in the opposite direction.

2. In a check for machines having an opening and a closing movement, a casing formed with a reservoir for a checking liquid and with a cylinder in the reservoir arranged to be immersed in the liquid, the cylinder having a port in its outer end portion opening into the lower portion of the reservoir, a piston working in the cylinder, a crank shaft journalled in the casing outside of the reservoir, a connecting rod between the piston and the crank shaft and extending out of the reservoir, an actuating member having a back and forth movement for connection to a moving part of the machine, and a reduction leverage mechanism between the actuating member and the crank shaft to cause the piston to make a complete reciprocation during the movement of the actuating member in one direction, and a complete reciprocation during the actuation of said member in the opposite direction, and a check valve in said port.

3. In a check for machines having an opening and a closing movement, a casing formed with a reservoir for a checking liquid and with a cylinder in the reservoir arranged to be immersed in the liquid, the cylinder having a port in its outer end portion opening into the lower portion of the reservoir, a piston working in the cylinder, a crank shaft journalled in the casing outside of the reservoir, a connecting rod between the piston and the crank shaft and extending out of the reservoir, an actuating member having a back and forth movement for connection to a moving part of the machine, and a reduction leverage mechanism between the actuating member and the crank shaft to cause the piston to make a complete reciprocation during the movement of the actuating member in one direction, and a complete reciprocation during the actuation of said member in the opposite direction, a check valve in said port, and means for adjusting the check valve and normally holding it different distances away from its seat.

4. In a check for machines having an opening and a closing movement, a casing formed with a reservoir for a checking liquid and with a cylinder in the reservoir arranged to be immersed in the liquid, the cylinder having a port in its outer end portion opening into the lower portion of the reservoir, a piston working in the cylinder, a crank shaft journalled in the casing outside of the reservoir, a connecting rod between the piston and the crank shaft and extending out of the reservoir, an actuating member having a back and forth movement for connection to a moving part of the machine, and a reduction leverage mechanism between the actuating member and the crank shaft to cause the piston to make a complete reciprocation during the movement of the actuating member in one direction, and a complete reciprocation during the actuation of said member in the opposite direction, the crank arm being arranged so that it moves from one side of the dead center line, passing through the axis of the crank shaft and the pivotal connection between the connecting rod and the piston, through the said dead center line to the opposite side thereof during each movement of the piston in one direction or the other.

5. In a check for machines having an opening and a closing movement, a casing formed with a reservoir for a checking liquid and with a cylinder in the reservoir arranged to be immersed in the liquid, the cylinder having a port in its outer end portion opening into the lower portion of the reservoir, a piston working in the cylinder, a crank shaft journalled in the casing outside of the reservoir, a connecting rod between the piston and the crank shaft and extending out of the reservoir, an actuating member having a back and forth movement for connection to a part of the machine, and a reduction leverage mechanism between the actuating member and the crank shaft to cause the piston to make a complete reciprocation during the movement of the actuating member in one direction, and a complete reciprocation during the actuating of said member in the opposite direction, the crank of the crank shaft being arranged at such a radial angle relatively to the dead center line of the crank shaft and the piston, that a maximum checking effect takes place at the end of each throw of the piston when it approaches the head end of the cylinder, and a minimum checking effect, during the intermediate part of the throw of the piston.

6. In a check for machines having an opening and a closing movement, a casing formed with a reservoir for a checking liquid and with a cylinder in the reservoir arranged to be immersed in the liquid, the cylinder having a port in its outer end portion opening into the lower portion of the reservoir, a piston working in the cylinder, a crank shaft journalled in the casing outside of the reservoir, a connecting rod between the piston and the crank shaft and extending out of the reservoir, an actuating member having a back and forth movement for connection to a moving part of the machine, and a reduction leverage mechanism between the actuating member and the crank shaft to cause the piston to make a complete reciprocation during the movement of the actuating member in one direction, and a complete reciprocation during the actuating of said member in the opposite direction, the crank of the crank shaft being arranged at such a radial angle relatively to the dead center line of the crank shaft and the piston, that a maximum checking effect takes place at the end of each throw of the piston when it approaches the head end of the cylinder, and a minimum checking effect, during the intermediate part of the throw of the piston, a check valve in the port, and adjustable means normally holding the check valve open a predetermined distance.

ERNEST DAVIS.